(12) United States Patent
Brunk

(10) Patent No.: US 11,549,531 B2
(45) Date of Patent: Jan. 10, 2023

(54) MULTI-CLINCH FASTENER INSERT

(71) Applicant: Penn Engineering & Manufacturing, Corp., Danboro, PA (US)

(72) Inventor: Jonathan Brunk, Philadelphia, PA (US)

(73) Assignee: Penn Engineering & Manufacturing Corp., Danboro, PA (US)

( * ) Notice: Subject to any disclaimer, the term of this patent is extended or adjusted under 35 U.S.C. 154(b) by 172 days.

(21) Appl. No.: 16/570,551

(22) Filed: Sep. 13, 2019

(65) Prior Publication Data

US 2020/0088224 A1    Mar. 19, 2020

Related U.S. Application Data

(60) Provisional application No. 62/730,765, filed on Sep. 13, 2018.

(51) Int. Cl.

| | | |
|---|---|---|
| *F16B 37/00* | (2006.01) | |
| *F16B 5/02* | (2006.01) | |
| *F16B 37/12* | (2006.01) | |
| *F16B 5/01* | (2006.01) | |

(52) U.S. Cl.
CPC .......... *F16B 5/0258* (2013.01); *F16B 37/122* (2013.01); *F16B 5/01* (2013.01)

(58) Field of Classification Search
CPC ......... F16B 5/0258; F16B 37/122; F16B 5/04
USPC ........ 411/103, 105, 108, 111–113, 131, 134, 411/176
See application file for complete search history.

(56) References Cited

U.S. PATENT DOCUMENTS

| | | | | |
|---|---|---|---|---|
| 2,508,409 | A | * 5/1950 | Lord | F16B 13/124 411/268 |
| 2,957,196 | A | 10/1960 | Kreider et al. | |
| 3,117,611 | A | * 1/1964 | Matthews | F16B 37/068 411/103 |
| 3,190,332 | A | * 6/1965 | Bernard | B65D 25/42 383/96 |
| 3,651,563 | A | 3/1972 | Volkmann | |
| 3,678,535 | A | 7/1972 | Charles | |
| 3,848,506 | A | * 11/1974 | Zifferer | F16B 13/124 411/17 |
| 4,381,633 | A | 5/1983 | Macleod | |
| 4,474,515 | A | 10/1984 | Pitzer | |

(Continued)

FOREIGN PATENT DOCUMENTS

| | | |
|---|---|---|
| EP | 2671654 A3 | 12/2013 |
| EP | 2752587 A1 | 7/2014 |

*Primary Examiner* — Gary W Estremsky
(74) *Attorney, Agent, or Firm* — Gregory J. Gore, Esq.

(57) ABSTRACT

An insert for the attachment of objects to composite or plastic panels consists of two parts, a retainer and an insert. The retainer has a through-hole and knurls on its perimeter for gripping the walls of a receiving hole in the composite or plastic panel. The insert has multiple self-clinching features at increasing diameters which when inserted into the retainer rigidly attach it to the retainer. The panel is rigidly clamped between opposite sides of the panel by an enlarged head of the retainer and an opposing flange on the insert. The self-clinching features of different diameter permit the device to be used with panels of different thickness and allow a large tolerance range. A plain or threaded stud can be substituted for the threaded hole of the insert. Both the retainer and the insert can be metallic.

12 Claims, 4 Drawing Sheets

(56) References Cited

U.S. PATENT DOCUMENTS

| | | | | |
|---|---|---|---|---|
| 4,713,960 | A * | 12/1987 | Gassaway | B21K 23/00 |
| | | | | 72/359 |
| 4,871,288 | A * | 10/1989 | Schmidt | B07B 1/4645 |
| | | | | 411/45 |
| 4,902,182 | A | 2/1990 | Lewis | |
| 4,981,735 | A * | 1/1991 | Rickson | F16B 5/01 |
| | | | | 156/92 |
| 5,000,637 | A * | 3/1991 | Adams | B29C 45/44 |
| | | | | 411/339 |
| 5,006,025 | A | 4/1991 | Duran | |
| 5,131,795 | A * | 7/1992 | Kobusch | B29C 65/645 |
| | | | | 411/178 |
| 5,324,151 | A | 6/1994 | Szudarek | |
| 6,088,878 | A * | 7/2000 | Antonucci | E05F 5/022 |
| | | | | 16/86 A |
| 6,287,064 | B1 * | 9/2001 | Jhumra | F16B 37/043 |
| | | | | 411/112 |
| 6,361,258 | B1 * | 3/2002 | Heesch | F16B 23/0084 |
| | | | | 411/178 |
| 7,118,303 | B2 * | 10/2006 | Doubler | F16B 33/006 |
| | | | | 403/362 |

* cited by examiner

MULTI-CLINCH FASTENER INSERT

RELATED APPLICATIONS

This is a non-provisional patent application related to provisional patent application entitled, "Multi Clinch Fastener Insert" filed Sep. 13, 2018 as application Ser. No. 62/730,765 priority from which is hereby claimed.

FIELD OF THE INVENTION

The present invention relates to insert fasteners which attach to structures through a hole which extends to an opposite of the structure, usually a planar panel. More specifically it relates to a two-component fastener which provides attachment to composite structures which are clamped between the two fastener components.

BACKGROUND OF THE INVENTION

The use of composite materials in engineering applications as a replacement for sheet metal has been a growing field for a number of years and is expected to continue to increase. The current options for threaded fasteners mostly rely on using adhesives to hold the fastener in place. There are many 2-piece inserts and potted inserts on the market in various sizes and configurations that utilize adhesives. There are also several types of mechanical or riveting inserts that deform around the panel. This style of fastener can have issues with thread strength, retention force, and the small bearing area created on the panel. The small bearing area creates high stress on the panel which can lead to failure of the material. The lack of thread strength is a result of the required materials for flaring and riveting, since the material must be soft enough to complete either of those operations.

Self-clinching fasteners have long been used in applications where the panel material is a ductile metal, such as steel or aluminum, but have not been useful in composite panels. The materials used in composite panels are either too brittle, like carbon fiber, or cannot support the required installation loads, such as with aluminum honeycomb panels.

There is therefore a need in the art for a fastener which will allow the benefits of self-clinching technologies to be applied to composite and non-metallic materials.

SUMMARY OF THE INVENTION

The present fastener described herein has been devised to meet the need in the art explained above that comprises two main components. The first component is a retainer with a through-hole and knurls on the perimeter of the part. The retainer is designed to be placed into a through hole of a composite or plastic panel. The second component is an insert that has multiple self-clinching features at increasing diameters. It is designed to install into the retainer and clinch the two pieces together. The multiple clinch features consisting of lands and undercuts allow the assembly to be used in a wide range of panel thicknesses and allow a large tolerance range. A plain or threaded stud can be substituted for the threaded hole of the insert As described below and shown in the figures of drawing, the present insert with clinch features can be made with internal threads, external threads, or be unthreaded. As a threaded part it serves as a mounting point to attach another panel or other object. With a through-hole it can be used to join two panels or multiple layers of material together in a secure joint. The through-hole allows a bolt to pass completely through or simply to reduce the weight of the fastener.

More specifically the applicant has devised a two-piece fastener for attachment to a panel comprising a retainer and an insert. The retainer is adapted to be received within a hole in a panel which extends through opposite sides of the panel. The retainer has a head of enlarged diameter and a shank with peripheral gripping means for engaging a wall of the panel hole and a central through-hole. The insert has multiple self-clinching features of successively increasing diameter adapted for attachment to the retainer. The insert is rigidly attached to the retainer by insertion into the retainer through-hole and deformation of a cylindrical through-hole wall by the self-clinching features. Each self-clinching feature comprises a land and an undercut for receiving material of the retainer displaced by the land.

In one embodiment the insert has a threaded through-bore and the self-clinching feature of greatest diameter is immediately adjacent the head. The retainer gripping means are longitudinal knurls on the periphery of the retainer. In one embodiment the insert has an elongate stud which extends from an end of the insert opposite the flange at the other end. When assembled to the panel the panel is clamped between the retainer head and the insert flange by direct contact with opposite sides of the panel. The retainer and insert may be either metallic or non-metallic. In one embodiment the panel is composed of a non-metallic composite material.

The present fastener allows for higher strength joints to be achieved in composite panels (primarily carbon fiber and honeycomb). The installation method has advantages over competing technologies because it is fast, simple, and strong. The pull-out strength of the installed fastener from the retainer is higher than most adhesive joints. The installation is completed on a hydraulic or other type of press in one stroke. This is much simpler and faster than applying adhesive and waiting for it to cure. Other objects and advantages of the fastener of the invention will be apparent to those of skill in the art from the following drawings and description of preferred embodiments.

DESCRIPTION OF THE PREFERRED EMBODIMENTS

Figure 1:
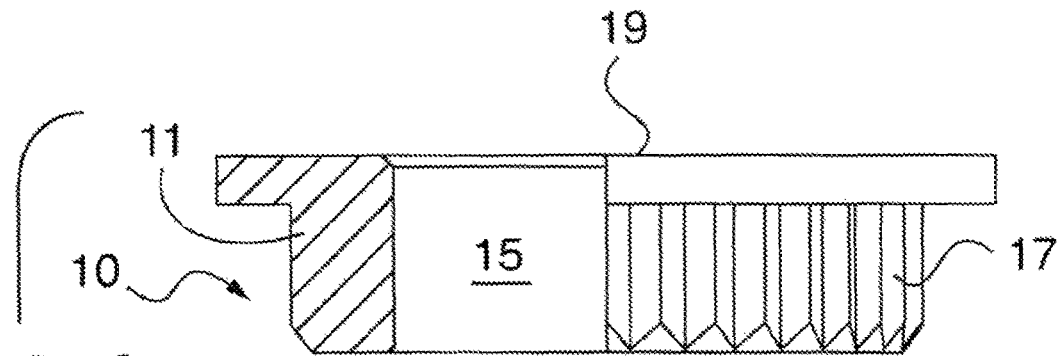
FIG. 1 is a compound illustration showing the retainer and insert individually, both from an elevation perspective with one being a sectional view of the other.
Figure 2:
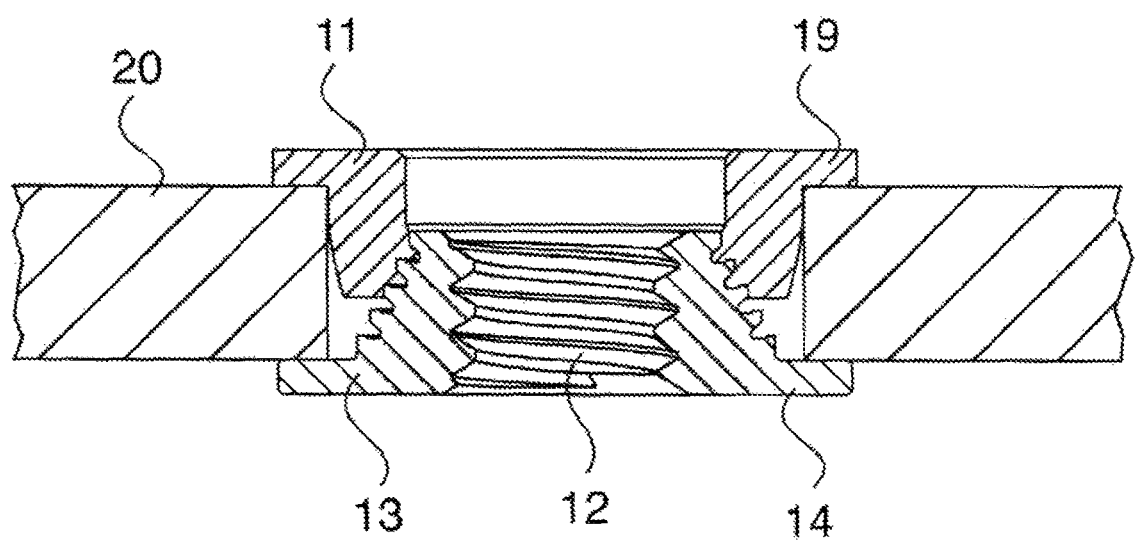
FIG. 2 is a sectional front elevation view showing the two-part insert assembled to a panel.

Referring now to FIGS. 1 and 2, one embodiment of the invention 10 includes two main components, a retainer and an insert. The retainer 11 has three main structural features: a through-hole 15 defining a cylinder in the center of the retainer, a shank 17 with knurls on its peripheral outer surface, and a head 19 of enlarged diameter to prevent the part from pulling into or through the panel 20 to which the fastener is affixed. The knurled shank 17 on the outside of the retainer 11 prevent rotation in the panel after installation as seen in FIG. 2.

The insert 13 is comprised of an enlarged flange 14 of similar shape to a series of undercuts 16 between step-wise displacer lands 18 at successively larger diameters toward the bottom. The undercuts are designed to accept the cold flow of material of the retainer 11 displaced by the lands 18 as the part is installed. Both parts shown here are circular in profile but other geometric shapes are possible.

Referring now specifically to FIG. 2, the present compound two-part fastener is shown assembled to a panel. Here, the two components, a retainer 11 and the multi-clinch insert 13 are clamped to a panel 20. The insert is received in a hole of the panel and is clinched to the retainer from the opposite side of the panel. During installation the insert and the retainer are pressed against each other until the retainer head 19 and the insert flange 14 contact the opposite sides of the panel 20. The threaded bore 12 of the insert can then receive a threaded bolt to attach an object (not shown) to the panel.

The retainer and insert are designed to install into a panel made from any variety of materials, either metallic or non-metallic. A typical material would be a honeycomb panel, which cannot currently utilize self-clinching fasteners. The insert and retainer are pressed together which displaces material of the retainer into the undercuts of the insert. The retainer material is chosen such that it is soft and ductile enough to cold flow due to the pressure exerted upon it. The insert is pressed into the retainer until the insert flange and retainer head at the ends of both components are in contact with the panel. One of the advantages of the multiple cascading clinch features is that the fastener can accommodate a range of panel thicknesses. It can also allow for large tolerances in the panel thickness.

Referring now to FIGS. 3 through 7, the sequence of installation in applying the insert into the retainer is shown with the panel removed for ease of depiction. During this process material of the retainer flows inward into the undercuts as it advances upward into the retainer bore by the wedging action of the lands between each of the undercuts which force the cold flow of retainer material into the undercuts as illustrated by the arrows in these figures.

Figure 3:
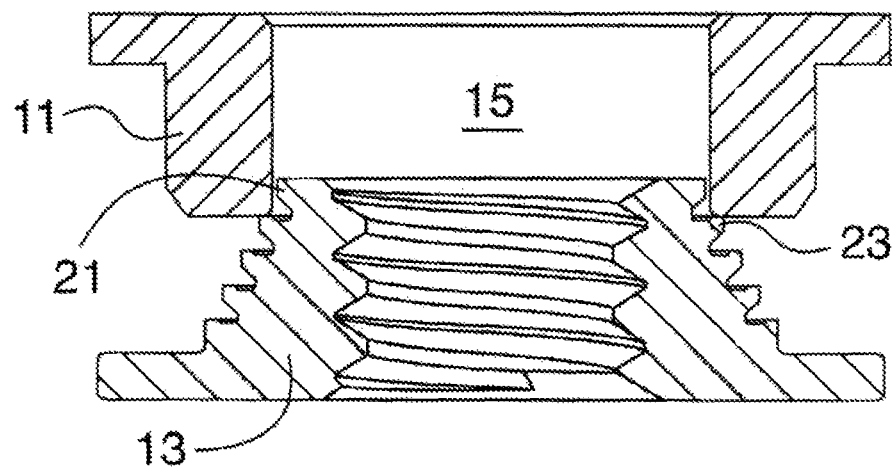
FIGS. 3 through 7 are side elevation views showing in sequence the progression of deformation of the retainer as it is pressed farther downward against the insert.

The first diagram of FIG. 3 shows how the insert seats in the retainer before being installed. The top rim 21 of the insert fits into the retainer bore as the bottom of the retainer rests upon the land 23 of the first undercut. As pressing progresses, this helps the material of retainer to flow inward and upward into the retainer bore since it prevents misalignment. At this point a load is applied to the head of the insert such as by a press (not shown). This forces material from the retainer to flow into the first undercut as seen in FIG. 4.

Figure 4:
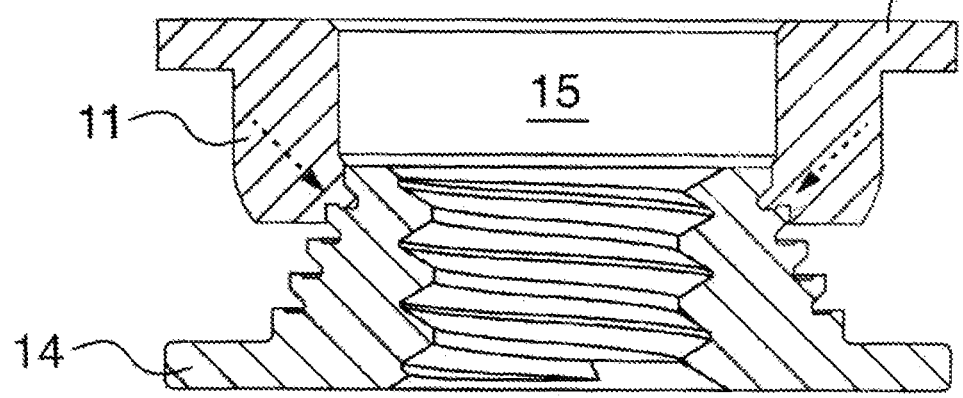

In FIG. 4 we see that the first undercut of the insert is now completely filled. At this point the fastener is securely installed. Further installation has the effect of increasing the strength of the joint and downward pressing can stop at any point. This point also defines the maximum panel thickness as the gap between the head of the retainer and the flange at the base of the insert. The fastener can then be installed farther as needed until the panel is rigidly clamped between the two components as seen in FIG. 2. The minimum panel thickness that can be used is defined by the height of the retainer minus the height of the retainer flange 19 and the insert flange 14.

Figure 5:
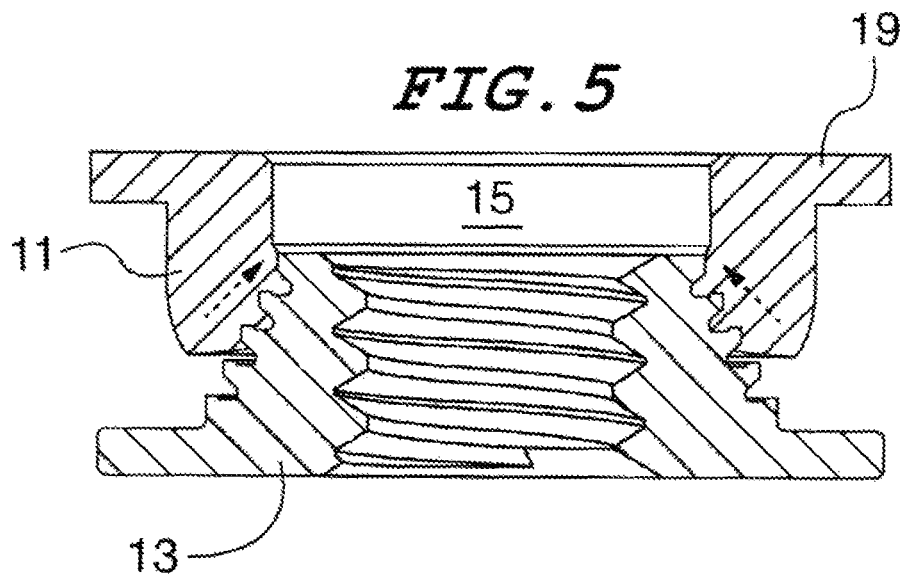
Figure 6:
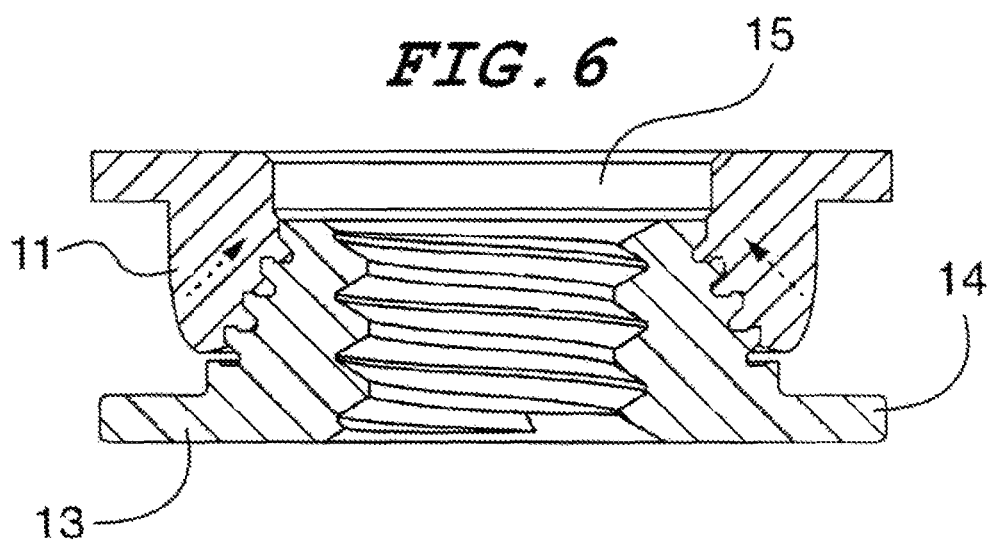
Figure 7:
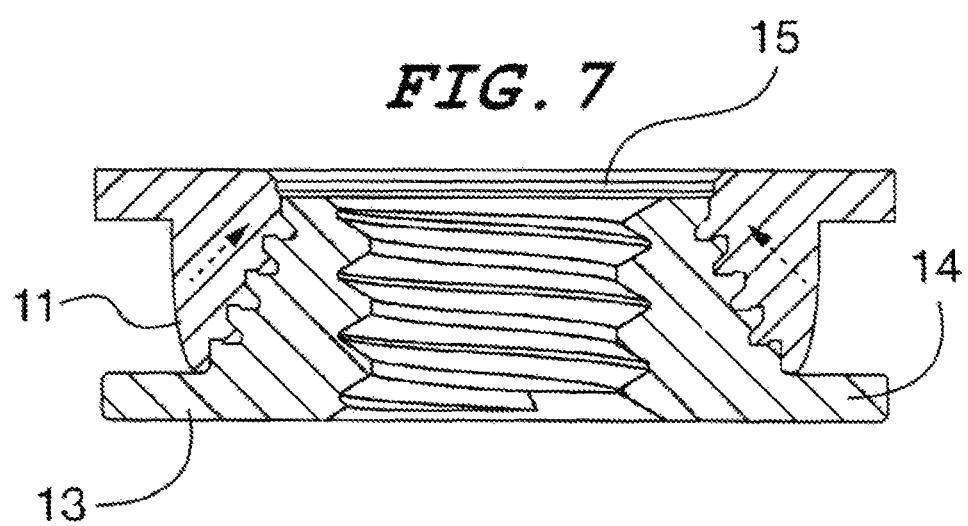

FIGS. 5-7 illustrate how the retainer 11 appears during progressively downward points of installation. As the retainer is pressed farther downward more of the material of the retainer flows farther inward into the undercuts and upward into the retainer bore 15. The retainer can continue to be pressed downward until the minimum panel thickness is reached as shown in FIG. 7. Here the retainer bore 15 is almost completely filled with the insert and displaced retainer material as the retainer 11 bottoms out against the top of the insert flange 14.

Figure 8:
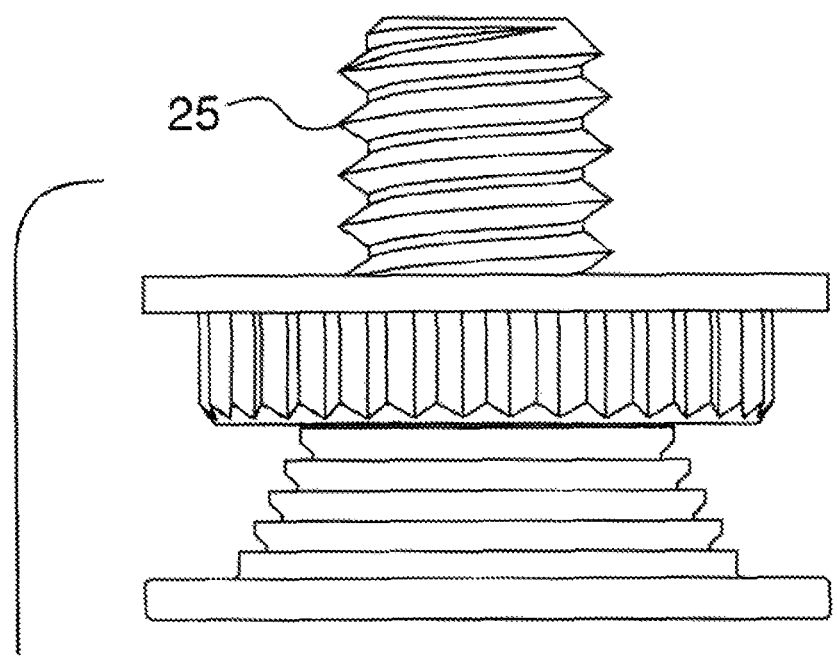
FIG. 8 is a compound illustration showing two drawings, one a sectional view of the other, of an alternate embodiment in which the insert has an externally threaded shank.
Figure 8:
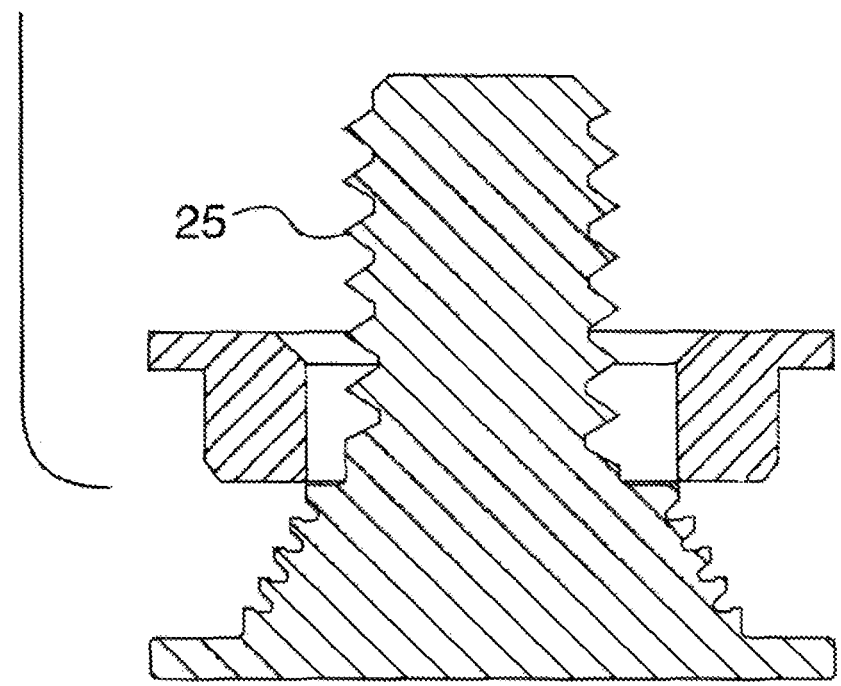

As depicted in FIG. 8, the insert can also be made in a similar way as shown in FIGS. 1-7 but with and upward extending external threaded stud 25 in place of a threaded bore. The insert stud can also be unthreaded if a plain pin is desired.

Specific embodiments have been used in the present invention to explain the principles and implementation of the present invention, and the description of the embodiments above only serves to help understand the main idea of the present invention. Meanwhile, a person ordinarily skilled in the art will be able to make changes to the specific implementation and the scope of application in accordance with the idea of the present invention. In all, the contents of the specification shall not be construed as limiting the scope of the invention which shall be defined only by the following claims and their legal equivalents.

What is claimed is:

1. A two-piece self-clinching fastener for attachment to a panel, comprising:
    a retainer adapted to be received within a hole in a panel, said retainer having a shank with peripheral gripping means for engaging a wall of the panel hole, the retainer further having a central through-hole with a wall defined by a cylinder; and
    an insert having multiple self-clinching features of successively increasing diameter adapted for attachment to the retainer by non-rotational insertion into the retainer through-hole causing deformation of the retainer through-hole wall and the cold flow of retainer material into one or more of the self-clinching features.

2. The device of claim 1 wherein the insert has a flange at one end immediately adjacent a self-clinching feature of greatest diameter.

3. The device of claim 2 wherein the insert has a threaded through-bore.

4. The device of claim 1 wherein the retainer gripping means are longitudinally extending knurls.

5. The device of claim 2 wherein the insert has an elongate stud which extends upwardly from the insert opposite the flange and the self-clinching features.

6. The device of claim 2 wherein the retainer has a head of enlarged diameter at one end from which the shank extends facing opposite the flange.

7. The device of claim 6 assembled to the panel which is rigidly clamped between the retainer head and an insert flange by direct contact with opposite sides of the panel between them.

8. The device of claim 1 wherein the retainer and insert are metallic.

9. The assembly of claim 7 wherein the panel is non-metallic.

10. The assembly of claim 7 wherein each self-clinching feature comprises a land and an undercut.

11. The assembly of claim 10 wherein the insert is attached to the retainer by displacement of retainer material by at least one of the lands into at least one of the undercuts.

12. A two-piece fastener for attachment to a panel and assembled to the panel, comprising:
    a retainer adapted to be received within a hole in a panel, said retainer having a shank with peripheral gripping means for engaging a wall of the panel hole, the retainer further having a central through-hole;

an insert having multiple self-clinching features of successively increasing diameter adapted for attachment to the retainer by insertion into the retainer through-hole causing deformation of a retainer through-hole wall by one or more of the self-clinching features; and wherein the retainer has a head of enlarged diameter at one end from which the shank extends whereby the panel is rigidly clamped between the retainer head and an insert flange by direct contact with opposite sides of the panel between them.

\* \* \* \* \*